United States Patent [19]
Eihusen

[11] Patent Number: 5,848,604
[45] Date of Patent: Dec. 15, 1998

[54] THERMALLY RESPONSIVE PRESSURE RELIEF SYSTEM

[75] Inventor: John A. Eihusen, Lincoln, Nebr.

[73] Assignee: Technical Products Group, Inc., Lilncoln, Nebr.

[21] Appl. No.: 960,614

[22] Filed: Oct. 29, 1997

[51] Int. Cl.⁶ .................................................. F16K 17/40
[52] U.S. Cl. .................................. 137/72; 137/79; 137/74
[58] Field of Search .................................. 137/72, 74, 79

[56] References Cited

U.S. PATENT DOCUMENTS

| | | |
|---|---|---|
| 1,678,605 | 7/1928 | Scott et al. . |
| 1,869,201 | 7/1932 | Lowe . |
| 3,455,316 | 7/1969 | Rogers . |
| 4,313,453 | 2/1982 | Holmes . |
| 4,457,327 | 7/1984 | Pepper . |
| 4,458,711 | 7/1984 | Flider . |
| 4,549,717 | 10/1985 | Dewaegheneire ........................... 137/79 |
| 4,972,965 | 11/1990 | Reznik . |
| 5,042,520 | 8/1991 | Reznik . |
| 5,255,809 | 10/1993 | Ervin et al. . |
| 5,419,357 | 5/1995 | Lhymn et al. . |
| 5,485,884 | 1/1996 | Hanley et al. ........................... 137/79 X |

*Primary Examiner*—John Fox
*Attorney, Agent, or Firm*—John R. Hoffman

[57] ABSTRACT

A thermally responsive pressure relief system is provided for a receptacle such as a pressure vessel. The system includes a thermally responsive pressure relief device on the vessel at a given location in communication with the interior of the vessel for venting the vessel in response to the pressure relief device being subjected to a given excess temperature. A heat pipe has one end thermally coupled to the pressure relief device and extends therefrom to a location remote from the given location. The heat pipe rapidly transmits heat from the remote location to the pressure relief device for venting the vessel in response to an excess temperature at the remote location.

8 Claims, 4 Drawing Sheets

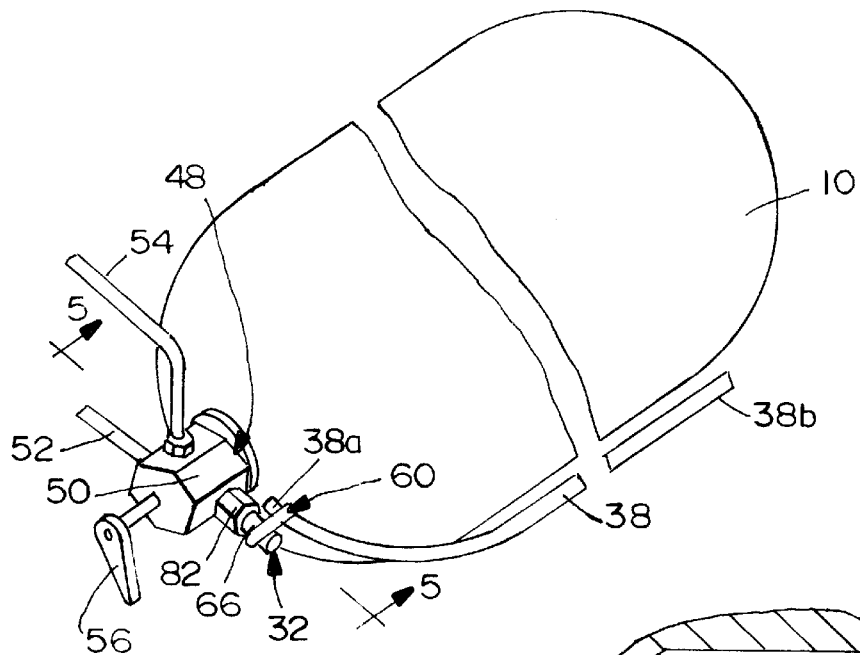
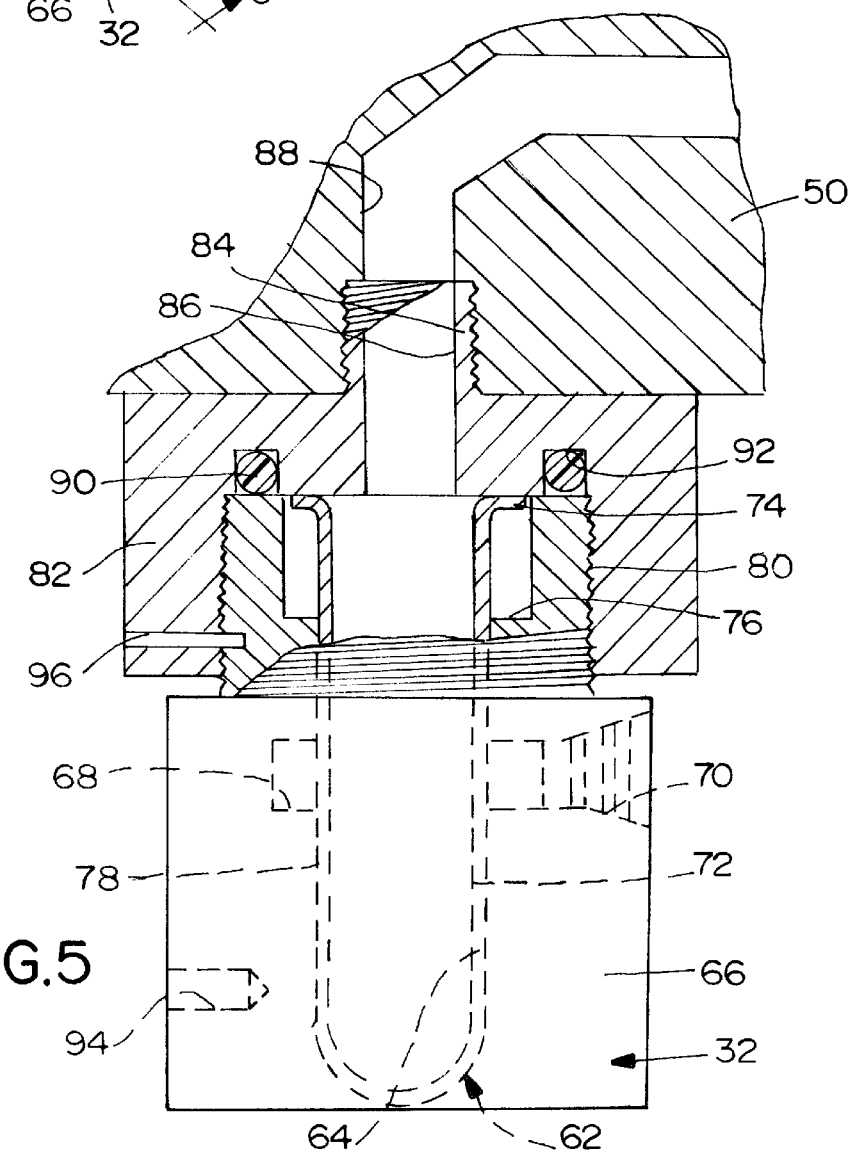

5,848,604

THERMALLY RESPONSIVE PRESSURE RELIEF SYSTEM

FIELD OF THE INVENTION

This invention generally relates to the art of safety devices for receptacles such as pressure vessels, for instance vessels which contain compressed gases.

BACKGROUND OF THE INVENTION

A variety of thermally responsive, fluid pressure relief devices and/or systems have been developed to protect receptacles, such as pressure vessels, in the event of fires. A pressure vessel may contain combustible fluids, such as natural gas. A common type of safety pressure relief device (PRD) may be thermally responsive, pressure responsive or both. In other words, a PRD may have a thermally responsive fusible bonding material which fixes a valve and melts to release the valve to vent the vessel in response to a given excess temperature. Other PRD's may include a rupturable member supported so that when the internal pressure of a vessel gets too high or exceeds a predetermined level, rupture occurs and fluid pressure is relieved. Hybrid temperature/pressure devices also have been used. Examples of thermally responsive pressure relief devices are shown in U.S. Pat. No. 5,435,333, dated Jul. 25, 1995, and U.S. Pat. No. 5,551,470, dated Sep. 3, 1996.

Problems arise when a pressure vessel is quite large or elongated and a single PRD is insufficient. These PRD's are fairly expensive.

As long as the pressure vessel is relatively small, such as a small round tank for instance, one safety PRD would suffice. However, if the vessel is narrow and relatively long, for instance, multiple PRD's must be installed on a given tank at different locations therealong, because areas of the tank may be remote from a confined fire, or areas of the tank may be isolated or blocked-off by portions of a supporting structure, such as the frame or chassis of a vehicle. In other words, one end of a long pressure vessel may be subjected to a fire, while the other end of the tank is either at a remote location or physically blocked from the fire and remains relatively cool. Therefore, multiple PRD's must be located at plural areas or surface points of the vessel that might be exposed to a remote or isolated fire.

The present invention is directed to solving these problems by providing a thermally responsive pressure relief system which is very simple and inexpensive in comparison to the systems of the prior art, requiring only a single PRD for relatively large or elongated containers or pressure vessels.

SUMMARY OF THE INVENTION

An object, therefore, of the invention is to provide a new and improved thermally responsive pressure relief system for a receptacle such as a pressure vessel or the like.

In the exemplary embodiment of the invention, the system includes a thermally responsive pressure relief device (PRD) on the vessel at a given location in communication with the interior of the vessel for venting the vessel in response to the PRD being subjected to a given excess temperature. A heat pipe has one end thermally coupled to the PRD and extends therefrom to a location remote from the given location. The heat pipe rapidly transmits heat from the remote location to the pressure relief device, and, therefore, vents the vessel in response to an excess temperature at the remote location.

As disclosed herein, the pressure vessel is elongated with opposite polar ends, and the PRD device is located at one polar end of the vessel. The heat pipe extends generally parallel to an axis of the pressure vessel which extends between the opposite polar ends thereof. In essence, the heat pipe runs from the PRD alongside the exterior of the vessel generally parallel to the elongated vessel axis.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, to- gether with its objects and the advantages thereof, may be best understood by reference to the following description taken in conjunction with the accompanying drawings, in which like reference numerals identify like elements in the figures and in which:

FIG. 4 is a fragmented perspective view of a pressure vessel with the system of the invention;

FIG. 5 is a fragmented section through the area of the coupling of the heat pipe to the PRD.

DETAILED DESCRIPTION OF THE PREFERRED EMBODIMENT

Figure 1:
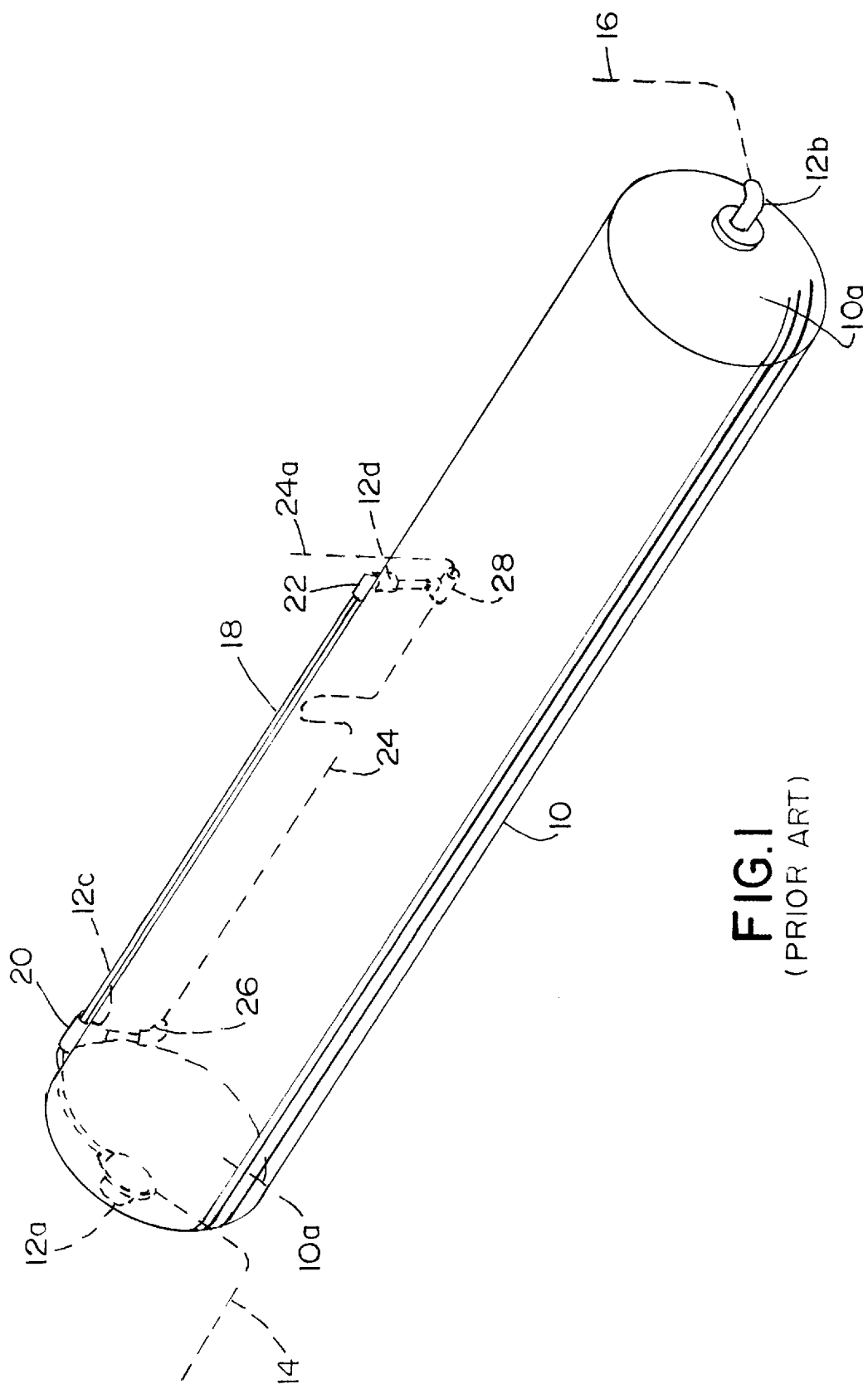
FIG. 1 is a somewhat schematic illustration of a thermally responsive pressure relief system according to the prior art.

Referring to the drawings in greater detail, and first to FIG. 1, a thermally responsive pressure relief system for a receptacle, such as an elongated pressure vessel 10, is shown according to the prior art. The pressure vessel is elongated and has opposite polar ends 10a. Some form or another of a thermally responsive pressure relief device (PRD) 12a and 12b is appropriately mounted at each polar end 10a. The end PRD's may be incorporated in polar bosses, for instance, so as to be in communication with the interior of vessel 10. PRD 12a is vented, as at 14, and PRD 12b is vented, as at 16. If a fire develops at the left-hand end of vessel 10, PRD 12a will be actuated and vent the vessel through vent line 14. If a fire develops at the right-hand end of vessel 10, the vessel will be vented by PRD 12b through vent line 16.

In addition, according to the prior art, one or more PRD's 12c, 12d and so on, are provided along the length of elongated pressure vessel 10. A common high pressure line 18 communicates with the interior of the tank through the polar boss at the left-hand end of the vessel. PRD 12c is connected to the common high pressure line by a T-coupling 20, and PRD 12d is connected to the high pressure line by an elbow-coupling 22. In addition, a common vent line 24 runs longitudinally of the vessel generally parallel to high pressure line 18 and is vented to atmosphere, as at 24a. PRD 12c is connected to the common vent line by an elbow-coupling 26, and PRD 12d is connected to the common vent line by a T-coupling 28. In essence, PRD's 12c and 12d are connected in parallel with high pressure line 18 and vent line 24 so that if a fire develops near any one of the PRD's along the lines, that PRD will be actuated to vent the pressure vessel to atmosphere. As is known, the vent lines should extend considerably remotely of the pressure vessel if the vessel contains a volatile fluid, such as natural gas, to prevent the volatile fluid from "feeding" the fire if any one of the PRD's is actuated. Of course, it can be understood that more than two PRD's 12c and 12d would have to be used if the pressure vessel is considerably elongated or a multitude of surface areas of the vessel are blocked off by surrounding support structures.

From the foregoing description of the prior art system in FIG. 1, it can be understood that such a system is quite expensive because of the number of PRD's required, along with the various couplings, pipes or conduits, and the like, even without considering the labor costs involved in manufacturing and assembling such a system. The costs of the PRD's, alone, is quite considerable.

Figure 2:
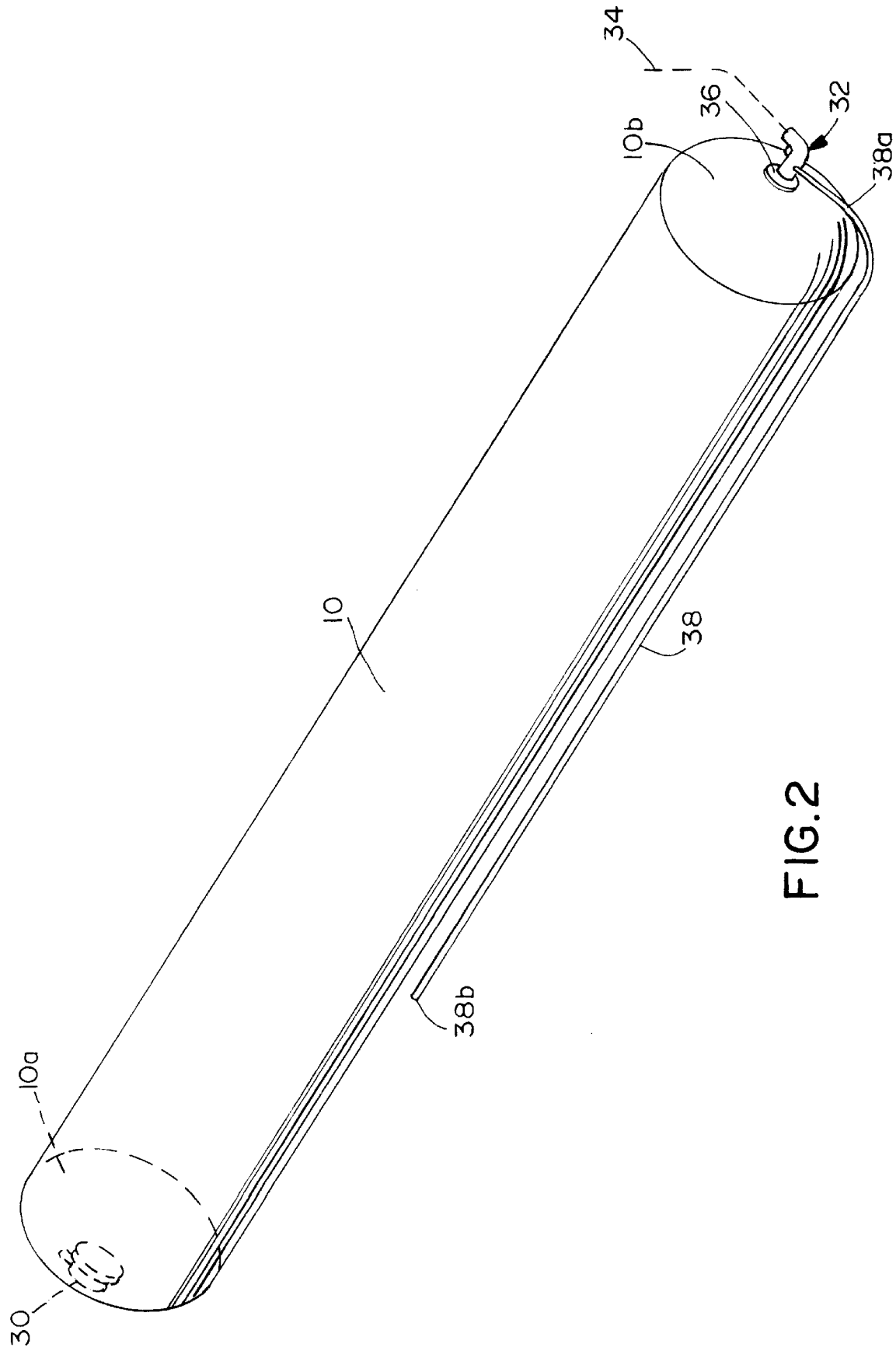
FIG. 2 is a somewhat schematic illustration of a thermally responsive pressure relief system according to the invention.

FIG. 2 shows a thermally responsive pressure relief system according to the present invention. Again, an elongated receptacle such as a pressure vessel 10 includes opposite polar ends 10a and 10b. Polar end 10a may or may not include a polar boss 30, but there is no requirement to even have a PRD at that end of the elongated vessel as will be understood below.

Specifically, the invention contemplates the provision of a thermally responsive pressure relief device (PRD), generally designated 32, at a given location on the vessel in communication with the interior of the vessel for venting the vessel, as at 34, in response to the pressure relief device being subjected to a given excess temperature. As shown in FIG. 2, the single thermally responsive pressure relief device is mounted in a polar boss 36 at polar end 10b of the vessel. The invention contemplates that a heat pipe 38 be provided with one end 38a thermally coupled to PRD 32 and extending therefrom to a location remote from the location of the PRD. In the exemplary embodiment, pressure vessel 10 is elongated and, thereby, defines an axis extending between its opposite polar bosses 30 and 36. Heat pipe 38 extends along the exterior of the vessel generally parallel to the axis thereof. The properties of the heat pipe are that it can transmit a very high amount of heat in a very short period of time. Therefore, the heat pipe is capable of transmitting heat from a fire developing at any location along the length of pressure vessel 10, remote from PRD 32, to the PRD and venting the vessel in response to an excess temperature at the remote location. The heat pipe can extend all the way to end 10a of the vessel, if necessary.

Figure 3:
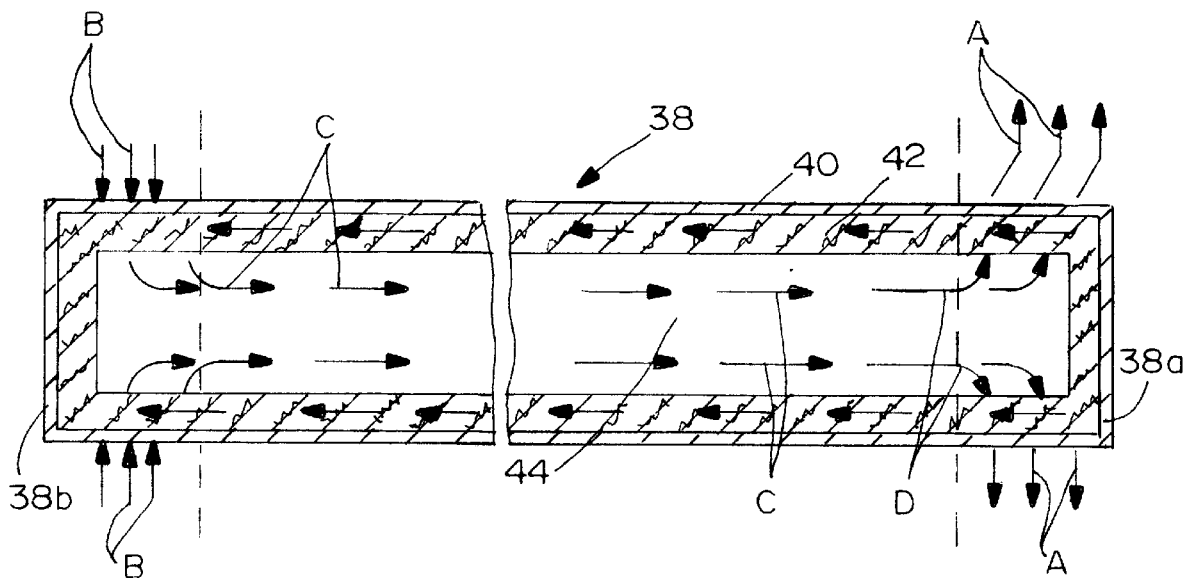
FIG. 3 is a fragmented longitudinal section through the heat pipe.

FIG. 3 shows an axial section through a heat pipe, such as heat pipe 38. The pipe is simple and includes an outer heat conducting casing 40 lined with a wicking material 42 and containing a vaporizable working fluid 44. Casing 40 can be of such materials as copper, nickel, stainless steel or the like. Wicking liner 42 can be of various threaded artery-type wicking material which operates by capillary action. Working fluid 44 can be of various fluids, such as water, methanol, sodium, mercury/magnesium or mercury/potassium mediums. Assuming that the right-hand end of heat pipe 38 in FIG. 3 corresponds to end 38a which is coupled to PRD 32 in FIG. 2, this can be considered the heat rejection condenser of the heat pipe, as indicated by arrows "A". A remote location of the heat pipe, such as opposite end 38b, would comprise the heat addition evaporator, as indicated by arrows "B". In operation, the working fluid permeates wicking material 42 by capillary action and, when heat is added to the evaporator end 38b of the heat pipe, the liquid is vaporized in the wick and moves through the central core of the heat pipe, as indicated by arrows "C" to condenser end 38a where the vapor condenses back into the wicking material, as at arrows "D" and heat is removed by the condenser action represented by arrows "A". This is a continuing cycle and, as is known, the heat pipe is capable of transmitting very high amounts of heat at a very rapid rate from a remote location, such as end 38b, to a condenser section, as at 38a. With the heat rejection condenser section of the heat pipe thermally coupled to PRD 32, the PRD will actuate and vent the pressure vessel at polar end 10b notwithstanding the fact the fire is at a location remote from polar end 10b.

It should be understood that the effectiveness of heat pipe 38 is not limited to heat being applied to an extreme remote end 38b and the heat being transmitted to the opposite end 38a which is connected to PRD 32. The heat pipe will "dump" heat automatically and substantially instantaneously to the coldest spot along the pipe. The mass of PRD 32 and polar boss 36 act as a heat sink to which the heat naturally migrates and is dumped or rejected by the internal action of the heat pipe.

FIGS. 4 and 5 show an application of the system of the invention described above in relation to FIG. 2, with a polar boss and PRD arrangement disclosed in the aforementioned U.S. Pat. No. 5,551,470. In particular, PRD 32 is used in conjunction with a fill shut-off valve means, generally designated 48, which includes a valve housing 50 threaded into an opening in pressure vessel 10. The fill/shut-off valve means can take a variety of configurations and, therefore, will not be descried in considerable detail herein. Suffice it to say, conventionally, the valve means includes a fill line 52 and a fuel line 54, the fuel line leading to a vehicle, for instance. A shut-off knob 56 is seen projecting from the end of valve housing 50. The precise arrangement or configuration of the interior valve components are not germane to the invention and are not shown nor described herein. A vent line 58 is shown leading from PRD 32. Heat pipe 38 is shown coupled to PRD 32 by a clamp 60.

Referring to FIG. 5 in conjunction with FIG. 4, PRD 32 includes a closure member or plug, generally designated 62, mounted within a passage 64 in a body member 66. The body member has an annular groove 68 communicating with an outlet 70 to which vent line 34 is coupled. Plug member 62 is generally hollow or cylindrical as defined by outside walls 72, with the upper end of the plug member including a radial flange 74 for abutting against a shoulder 76 of body 66. The plug member is affixed within passage 64 by a thermally sensitive, fusible bonding material 78.

In the structure of FIG. 5, body 66 is threaded, as at 80, into an adapter body 82 which has a small exteriorly threaded boss 84 for threading into a passage 86 communicating with a passage 88 in the valve housing. Therefore, rupturable plug member 62 of PRD 32 is mounted in a continuous passage, including passages 88, 86 and 64, communicating the interior of vessel 10 with the exterior thereof.

Lastly, still referring to FIG. 5, an O-ring 90 is sandwiched between the inner end of body 66 and an annular groove 92 to create a leak-proof seal between the two bodies. Body 66 has "spanner" holes 94 to facilitate threading the body into adapter body 82, and the adapter body may be of a hexagonal configuration as shown in FIG. 4 for threading the adapter body into valve housing 50. A drive pin 96 may be used to stake adapter body 82 to body 66 to prevent inadvertent disassembly.

Figure 6:
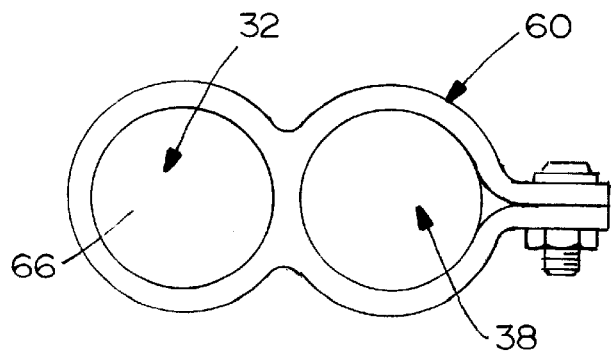
FIG. 6 shows a clamp for coupling the heat pipe to the PRD.

FIG. 6 shows clamp 60 for thermally coupling PRD body 66 to heat pipe 38. The clamp may be fabricated of high heat conductive material to further facilitate rapid transmission of heat from the heat pipe to the PRD. Although not shown in FIG. 6, the clamp may be such as to clamp the end of the heat pipe directly to the PRD body. When the heat pipe "dumps" or rejects its heat to the PRD body, bonding material 78 fuses and plug member 62 moves the vent the interior of tank 10 through vent 34.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A thermally responsive pressure relief system for a receptacle such as a pressure vessel, comprising:

a thermally responsive pressure relief device on the vessel at a given location in communication with the interior of the vessel for venting the vessel in response to the pressure relief device being subjected to a given excess temperature; and a heat pipe having one end thermally coupled to the pressure relief device and extending therefrom to a location remote from said given location for rapidly transmitting heat from the remote location to the pressure relief device for venting the vessel in response to an excess temperature at the remote location.

2. The thermally responsive pressure relief system of claim 1 wherein the pressure vessel is elongated with opposite polar ends, and said thermally responsive pressure relief device is located at one polar end of the vessel.

3. The thermally responsive pressure relief system of claim 2 wherein said heat pipe extends generally parallel to an axis of the pressure vessel which extends between the opposite polar ends thereof.

4. The thermally responsive pressure relief system of claim 1 wherein the pressure vessel is elongated, defining a longitudinal axis, and said heat pipe extends alongside the exterior of the vessel generally parallel to the axis.

5. A thermally responsive pressure relief system for a receptacle such as a pressure vessel, comprising:

a thermally responsive pressure relief device on the vessel at a given location in communication with the interior of the vessel for venting the vessel in response to the pressure relief device being subjected to a given excess temperature; and a heat pipe extending from the pressure relief device to a location remote from said given location for rapidly transmitting heat from the remote location to the pressure relief device for venting the vessel in response to an excess temperature at the remote location.

6. The thermally responsive pressure relief system of claim 6 wherein the pressure vessel is elongated with opposite polar ends, and said thermally responsive pressure relief device is located at one polar end of the vessel.

7. The thermally responsive pressure relief system of claim 6 wherein said heat pipe extends generally parallel to an axis of the pressure vessel which extends between the opposite polar ends thereof.

8. The thermally responsive pressure relief system of claim 5 wherein the pressure vessel is elongated, defining a longitudinal axis, and said heat pipe extends alongside the exterior of the vessel generally parallel to the axis.

* * * * *